United States Patent
Chen et al.

(10) Patent No.: US 12,489,628 B2
(45) Date of Patent: Dec. 2, 2025

(54) DATA TRANSMISSION METHOD AND APPARATUS THEREOF

(71) Applicant: MEDIATEK INC., Hsinchu (TW)

(72) Inventors: Cheng-Huan Chen, Hsinchu (TW); Tzu-Wen Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 124 days.

(21) Appl. No.: 18/585,443

(22) Filed: Feb. 23, 2024

(65) Prior Publication Data

US 2025/0274282 A1 Aug. 28, 2025

(51) Int. Cl.
*H04L 9/32* (2006.01)
*G06F 21/50* (2013.01)
*G06F 21/60* (2013.01)

(52) U.S. Cl.
CPC ............... *H04L 9/32* (2013.01); *G06F 21/50* (2013.01); *G06F 21/60* (2013.01); *G06F 21/606* (2013.01)

(58) Field of Classification Search
CPC . H04L 9/32; G06F 21/50; G06F 21/60; G06F 21/606
See application file for complete search history.

(56) References Cited

U.S. PATENT DOCUMENTS 9,081,712 B2 * 7/2015 Kotzur ............... G06F 11/1068
2021/0281399 A1 * 9/2021 Michael ............... G06F 21/606

FOREIGN PATENT DOCUMENTS

| CA | 2965119 C | * | 4/2023 | ......... H04W 52/0216 |
| TW | I803456 B | * | 6/2023 | ............. G06F 21/60 |

* cited by examiner

*Primary Examiner* — Jayesh M Jhaveri
(74) *Attorney, Agent, or Firm* — McClure, Qualey & Rodack, LLP

(57) ABSTRACT

A data transmission method is provided. The data transmission method may include the following steps. A first memory of a master microcontroller (MCU) of an apparatus may store an encrypted header and firmware data associated with a slave MCU of the apparatus. The encrypted header may include information corresponding to the firmware data, and the firmware data may include a plurality of firmware blocks. Then, the master MCU may transmit the encrypted header to the slave MCU. Then, the slave MCU may decrypt the encrypted header to obtain the information corresponding to the firmware data. Then, the slave MCU may obtain the firmware blocks from the master MCU according to a plurality of pre-defined settings and the information corresponding to the firmware data. Then, a second memory of the MCU may store the firmware blocks.

20 Claims, 2 Drawing Sheets

DATA TRANSMISSION METHOD AND APPARATUS THEREOF

BACKGROUND OF THE INVENTION

Field of the Invention

The invention generally relates to data transmission technology, and more particularly, to a data transmission technology between a master microcontroller unit (MCU) and a slave MCU.

Description of the Related Art

In the conventional technology, an electronic apparatus may have more than one microcontrollers (MCUs). The master MCU may have the non-volatile memory (e.g., NAND flash memory or embedded multimedia card (eMMC)) and the volatile memory (e.g., dynamic random access memory, DRAM), but the slave MCU may only have the volatile memory. Therefore, the firmware data of the slave MCU may be stored in the master MCU.

However, when the firmware data of slave MCU needs to be downloaded from the non-volatile memory of the master MCU to volatile memory of the slave MCU before the electronic apparatus turns on or boots, the master MCU may obtain the information of firmware data of slave MCU. Therefore, the information of firmware data of slave MCU may not have sufficient protection.

Therefore, how to increase the protection of the information of firmware data of slave MCU is a topic that is worthy of discussion.

BRIEF SUMMARY OF THE INVENTION

Verification methods and apparatus are provided to overcome the problems mentioned above.

An embodiment of the invention provides a data transmission method. The data transmission method may include the following steps. A first memory of a master microcontroller (MCU) of an apparatus may store an encrypted header and firmware data associated with a slave MCU of the apparatus. The encrypted header may include information corresponding to the firmware data, and the firmware data may include a plurality of firmware blocks. Then, the master MCU may transmit the encrypted header to the slave MCU. Then, the slave MCU may decrypt the encrypted header to obtain the information corresponding to the firmware data. Then, the slave MCU may obtain the firmware blocks from the master MCU according to a plurality of pre-defined settings and the information corresponding to the firmware data. Then, a second memory of the MCU may store the firmware blocks.

In some embodiments, the information may comprise identifiers, offsets, sizes, attributes and authentication data of the firmware blocks.

In some embodiments, the pre-defined settings correspond to the information corresponding to the firmware data, and wherein the pre-defined settings comprises rules or policies of downloading each firmware block to its corresponding destination address in the second memory.

In some embodiments, when decrypting the encrypted header, the slave MCU may decrypt the encrypted header using a key to obtain the information corresponding to the firmware data. The key may be stored in a one-time-programmable (OTP) memory of the slave MCU.

In some embodiments, when obtaining the firmware blocks from the master MCU according to the pre-defined settings and the information corresponding to the firmware data, the slave MCU may transmit a request message to the master MCU to obtain at least one firmware block according to the pre-defined settings and the information corresponding to the firmware data. In addition, the master MCU may transmit said firmware block or blocks to the slave MCU.

In some embodiments, the slave MCU may decrypt at least one firmware block from the master MCU in response to said firmware block or blocks having previously been encrypted or compressed.

In some embodiments, the master MCU may transmit more than one firmware block to the slave MCU at once in response to the master MCU and the slave MCU supporting multi-channel communication.

In some embodiments, the slave MCU may transmit a close session message to the master MCU in response to completion of a download process for the firmware blocks.

In some embodiments, the slave MCU may store the encrypted header from the master MCU in a buffer of the slave MCU.

In some embodiments, the first memory may be a non-volatile memory and the second memory may be a volatile memory.

An embodiment of the invention provides an apparatus. The apparatus may include a master MCU and a slave MCU. The master MCU may include a first communication circuit, a first memory and a first processor which is coupled to the first communication unit and the first memory. The slave MCU may include a second communication circuit, a second memory and a second processor which is coupled to the second communication unit and the second memory. During operation, the first processor and the second processor may perform the following operations. The first processor may store an encrypted header and firmware data associated with a slave MCU of the apparatus in the first memory. The encrypted header may comprise information corresponding to the firmware data, and the firmware data may comprise a plurality of firmware blocks. The first processor may transmit the encrypted header to the slave MCU through the first communication circuit. The second processor may decrypt the encrypted header to obtain the information corresponding to the firmware data. The second processor may obtain the firmware blocks from the master MCU through the second communication circuit according to a plurality of pre-defined settings and the information corresponding to the firmware data. The second processor may store the firmware blocks in the second memory.

Other aspects and features of the invention will become apparent to those with ordinary skill in the art upon review of the following descriptions of specific embodiments of the data transmission method and the apparatus.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
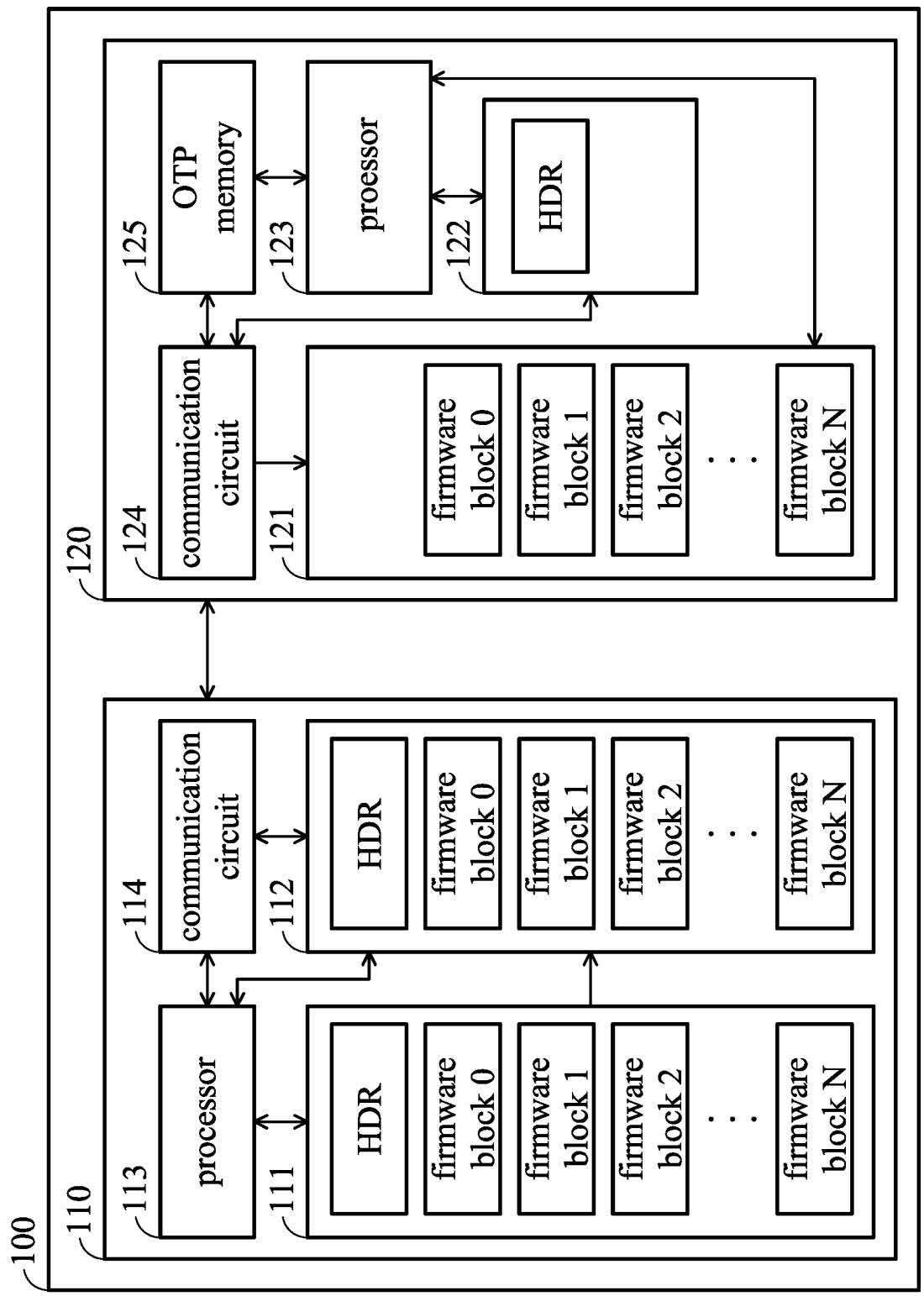
FIG. 1 is a block diagram of an electronic apparatus 100 according to an embodiment of the invention.

FIG. 1 is a block diagram of an electronic apparatus 100 according to an embodiment of the invention. As shown in FIG. 1, the electronic apparatus 100 may comprise a master microcontroller (MCU) 110 and a slave MCU 120. It should be noted that, in order to clarify the concept of the invention, FIG. 1 presents a simplified block diagram of the electronic apparatus 100. However, the invention should not be limited to what is shown in FIG. 1. That is, the electronic apparatus 100 may comprise other elements. For example, the electronic apparatus 100 may comprise more than one slave MCU.

According to an embodiment of the invention, the electronic apparatus 100 may be a smart phone, a tablet, a notebook, or any other device with multiple MCUs.

As shown in FIG. 1, the master MCU 110 may comprise a non-volatile memory 111, a volatile memory 112, a processor 113, and a communication circuit 114. It should be noted that, in order to clarify the concept of the invention, FIG. 1 presents a simplified block diagram. However, the invention should not be limited to what is shown in FIG. 1. For example, the master MCU 110 may comprise other elements.

The non-volatile memory 111 may be a flash memory (e.g., NAND flash memory or embedded multimedia card (eMMC)), a Read-Only Memory (ROM), or a non-volatile random-access memory. The volatile memory 112 may be a Random Access Memory (RAM) such as Dynamic Random Access Memory (DRAM).

The non-volatile memory 111 may store an encrypted header HDR and firmware data associated with the slave MCU 120. According to an embodiment of the invention, the encrypted header HDR may be pre-encrypted by an encryption key and have a fixed length. The encrypted header HDR may comprise information corresponding to the firmware data associated with the slave MCU 120. The firmware data associated with the slave MCU 120 may be divided into several firmware slices. That is to say, the firmware data may comprise a plurality of firmware blocks, e.g., firmware block 0, firmware block 1 . . . and firmware block N. In addition, according to an embodiment of the invention, the information corresponding to the firmware data associated with the slave MCU 120 may comprise the identifiers (IDs), offsets, sizes, attributes and the authentication data of the firmware blocks of the firmware data, but the invention should not be limited thereto. That is to say, each firmware block may have its corresponding identifier, offset, size attribute and authentication data.

The volatile memory 112 may be configured to store the encrypted header HDR and firmware data associated with the slave MCU 120. When the slave MCU 120 wants to download the firmware data from the master MCU 110, the encrypted header HDR and the firmware data associated with the slave MCU 120 may be moved from the non-volatile memory 111 to the volatile memory 112 first.

The communication circuit 114 may be a communication interface which is used to communicate with the slave MCU 120. The communication circuit 114 may be configured to transmit the encrypted header HDR and firmware data associated with the slave MCU 120 from the volatile memory 112 to the slave MCU 120.

The processor 113 may be coupled to the non-volatile memory 111, the volatile memory 112 and the communication circuit 114 to control the operations of the non-volatile memory 111, the volatile memory 112 and the communication circuit 114.

In addition, as shown in FIG. 1, the slave MCU 120 may comprise a volatile memory 121, a volatile memory 122, a processor 123, a communication circuit 124, and a one-time programmable (OTP) memory 125. It should be noted that, in order to clarify the concept of the invention, FIG. 1 presents a simplified block diagram. However, the invention should not be limited to what is shown in FIG. 1. For example, the slave MCU 120 may comprise other elements.

The volatile memory 121 may be a RAM such as DRAM. The volatile memory 121 may be configured to store the firmware blocks of the firmware data from the master MCU 110. The volatile memory 122 may be a buffer. The volatile memory 122 may be configured to store the encrypted header HDR from the master MCU 110.

The communication circuit 124 may be a communication interface which is used to communicate with the master MCU 110. The communication circuit 114 may be configured to receive the encrypted header HDR and firmware data associated with the slave MCU 120 from the master MCU 110.

The OTP memory 125 may be configured to store a decryption key to decrypt the encrypted header HDR. The decryption key may correspond to the encryption key which is used to encrypt the encrypted header HDR.

The processor 123 may be coupled to the volatile memory 121, the volatile memory 122, the communication circuit 124 and the OTP memory 125 to control the operations of the volatile memory 121, the volatile memory 122, the communication circuit 124 and the OTP memory 125.

According to an embodiment of the invention, when the slave MCU 120 wants to download the firmware data from the master MCU 110 before the electronic apparatus 100 boots, the encrypted header HDR and the firmware data associated with the slave MCU 120 may be moved from the non-volatile memory 111 to the volatile memory 112 first. Then, the communication circuit 114 may transmit the encrypted header HDR to the slave MCU 120.

The communication circuit 124 may receive the encrypted header HDR from the communication circuit 114. Then, the encrypted header HDR may be stored in the volatile memory 122. Then, the processor 123 may decrypt the encrypted header HDR according to the decryption key stored in the OTP memory 125 and parse the decrypted header HDR. Specifically, after decrypting the encrypted header HDR, the processor 123 may parse the decrypted header HDR to obtain the information corresponding to the firmware data associated with the slave MCU 120. Then, the processor 123 may obtain or download the firmware blocks of the firmware data according to the information corresponding to the firmware data associated with the slave MCU 120 and a plurality of pre-defined settings. According to an embodiment of the invention, the pre-defined settings may be corresponded to or mapped to the information corresponding to the firmware blocks of the firmware data associated with the slave MCU 120. The pre-defined settings may be pre-specified and pre-stored in the slave MCU. The pre-defined settings may comprise the rules or policies of downloading each firmware block to its corresponding destination address in the volatile memory 121, but the invention should not be limited thereto. For example, the pre-defined settings may comprise the download order of the firmware blocks and the destination address of each firmware block to indicate how to download the firmware blocks.

Specifically, according to the information corresponding to the firmware data associated with the slave MCU 120 and the pre-defined settings, the communication circuit 124 may transmit a request message to the master MCU 110 to obtain or download one or more of the firmware blocks of the firmware data. Then, the master MCU 110 may upload the requested firmware blocks to the slave MCU 120. Then, according to the information corresponding to the firmware data associated with the slave MCU 120 and the pre-defined settings, the slave MCU 120 may store the firmware blocks from the master MCU 110 into its corresponding destination addresses in the volatile memory 121. Then, according to the information corresponding to the firmware data associated with the slave MCU 120 and the pre-defined settings, the communication circuit 124 may transmit another request message to the master MCU 110 to obtain or download one or more of the remaining firmware blocks of the firmware data. Accordingly, the slave MCU 120 may download the firmware blocks of the firmware data from the master MCU 110 until all firmware blocks of the firmware data associated with the slave MCU 120 have been stored into its corresponding destination addresses in the volatile memory 121. When the download process for the firmware blocks of the firmware data associated with the slave MCU 120 has been completed, the slave MCU 120 may transmit a close session message to the master MCU 110. Accordingly, according to the above embodiments of the invention, the information corresponding to the firmware data associated with the slave MCU 120 will not be known or obtained by the master MCU 110.

According to an embodiment of the invention, the firmware blocks of the firmware data associated with the slave MCU 120 may be processed by different operations (e.g., encrypt or compress, but the invention should not be limited thereto) previously. For example, one or more of the firmware blocks of the firmware data associated with the slave MCU 120 may be encrypted previously. Therefore, before storing these encrypted firmware blocks into its corresponding destination addresses in the volatile memory 121, the slave MCU 120 may decrypt theses encrypted firmware blocks according to the information corresponding to the firmware data associated with the slave MCU 120 and the pre-defined settings. In another example, one or more of the firmware blocks of the firmware data associated with the slave MCU 120 may be compressed previously. Therefore, before storing these compressed firmware blocks into its corresponding destination addresses in the volatile memory 121, the slave MCU 120 may decompress theses compressed firmware blocks according to the information corresponding to the firmware data associated with the slave MCU 120 and the pre-defined settings.

According to an embodiment of the invention, when the master MCU 110 and the slave MCU 120 support multi-channel communication, i.e., there more than one channels between the communication circuit 114 and the communication circuit 124, the master MCU 110 may transmit or upload more than one firmware block to the slave MCU at once. That is to say, the slave MCU 120 may transmit one request message to download more than one firmware block at the same time. In addition, if the firmware blocks are processed by different operations (e.g., encrypt or compress, but the invention should not be limited thereto) previously. The slave MCU 120 may perform different operations (e.g., decrypt or decompress, but the invention should not be limited thereto) for the firmware blocks respectively.

Figure 2:
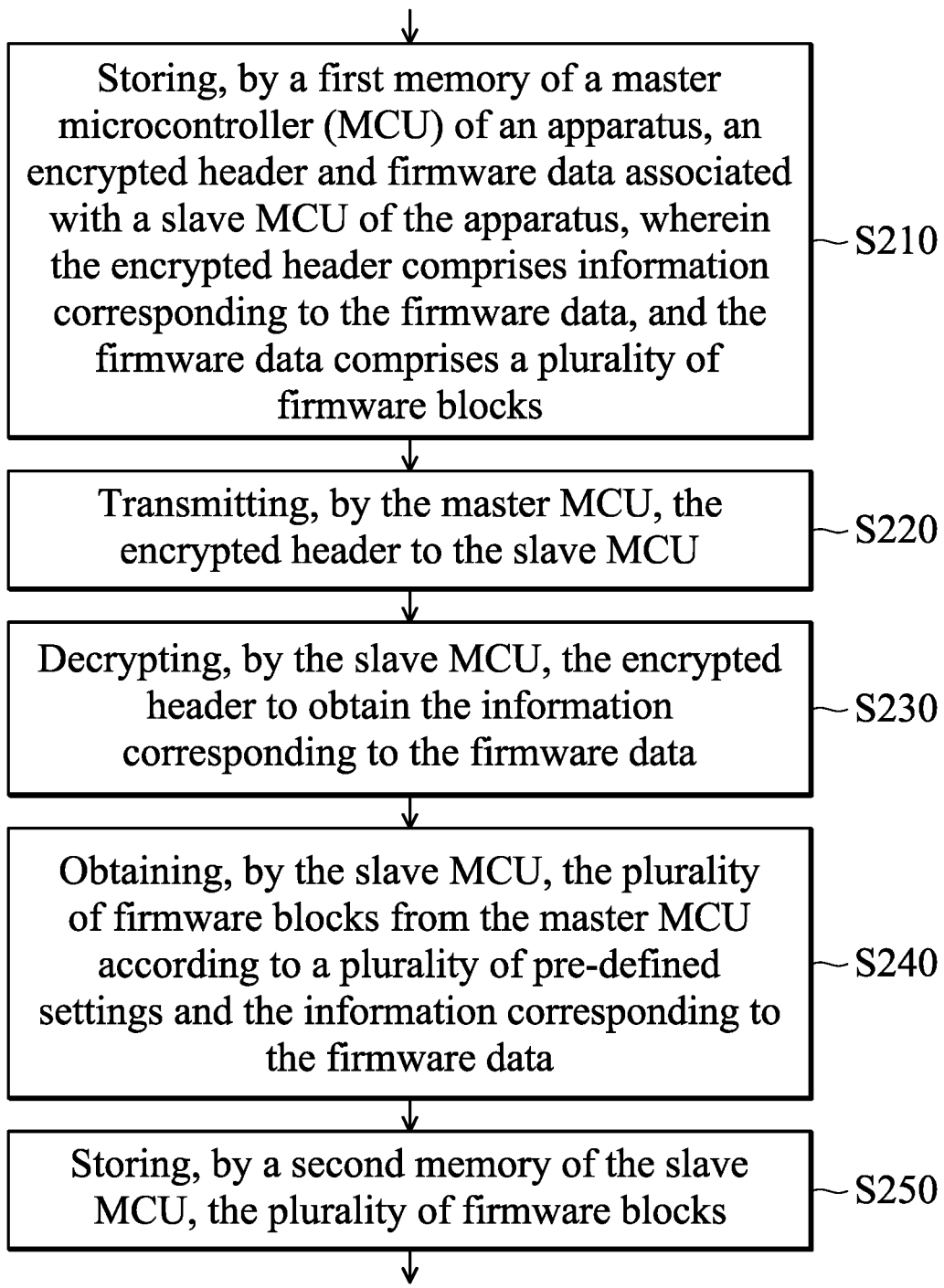
FIG. 2 is a flow chart illustrating a data transmission method according to an embodiment of the invention.

FIG. 2 is a flow chart illustrating a data transmission method according to an embodiment of the invention. The data transmission method can be applied to the electronic apparatus 100. As shown in FIG. 2, in step S210, a master microcontroller (MCU) of the electronic apparatus 100 may store an encrypted header and firmware data associated with a slave MCU of the electronic apparatus 100 to a first memory (i.e., the non-volatile memory 111) of the master MCU of the electronic apparatus 100. The encrypted header may comprise information corresponding to the firmware data, and the firmware data may comprise a plurality of firmware blocks.

In step S220, the master MCU of the electronic apparatus 100 may transmit the encrypted header to the slave MCU of the electronic apparatus 100.

In step S230, the slave MCU of the electronic apparatus 100 may decrypt the encrypted header to obtain the information corresponding to the firmware data.

In step S240, the slave MCU of the electronic apparatus 100 may obtain the plurality of firmware blocks from the master MCU according to a plurality of pre-defined settings and the information corresponding to the firmware data.

In step S250, the slave MCU of the electronic apparatus 100 may store the plurality of firmware blocks in a second memory (i.e., volatile memory 121) of the slave MCU.

According to an embodiment, in the data transmission method, the information comprises identifiers, offsets, sizes, attributes and authentication data of the plurality of firmware blocks.

According to an embodiment, in the data transmission method, the plurality of pre-defined settings correspond to the information corresponding to the firmware data, and the plurality of pre-defined settings comprises rules or policies of downloading each firmware block to its corresponding destination address in the second memory.

According to an embodiment, in the data transmission method, the slave MCU of the electronic apparatus 100 may decrypt the encrypted header through a key to obtain the information corresponding to the firmware data, wherein the key is stored in a one-time programmable (OTP) memory of the slave MCU.

According to an embodiment, in the data transmission method, the slave MCU of the electronic apparatus 100 may transmit a request message to the master MCU to obtain at least one of the plurality of firmware blocks according to the plurality of pre-defined settings and the information corresponding to the firmware data. Then, the master MCU of the electronic apparatus 100 may transmit the at least one of the plurality of firmware blocks to the slave MCU.

According to an embodiment, in the data transmission method, the slave MCU of the electronic apparatus 100 may decrypt or decompress at least one of the plurality of firmware blocks from the master MCU in response to the at least one of the plurality of firmware blocks having previously been encrypted or compressed.

According to an embodiment, in the data transmission method, the master MCU of the electronic apparatus 100 may transmit more than one firmware block to the slave MCU at once in response to the master MCU and the slave MCU supporting multi-channel communication.

According to an embodiment, in the data transmission method, the slave MCU of the electronic apparatus 100 may transmit a close session message to the master MCU in response to a download process for the plurality of firmware blocks having been completed.

According to an embodiment, in the data transmission method, the slave MCU of the electronic apparatus 100 may store the encrypted header from the master MCU in a buffer of the slave MCU.

According to an embodiment, in the data transmission method, the first memory is a non-volatile memory and the second memory is a volatile memory.

According to some examples provided in the invention, the slave MCU downloads the firmware blocks from the master MCU, the information of the firmware blocks will not be obtained by the master MCU. Therefore, the information of the firmware blocks associated with the salve MCU will be able to be protected.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data transmission method, comprising:
   storing, by a first memory of a master microcontroller unit (MCU) of an apparatus, an encrypted header and firmware data associated with a slave MCU of the apparatus, wherein the encrypted header comprises information corresponding to the firmware data, and the firmware data comprises a plurality of firmware blocks;
   transmitting, by the master MCU, the encrypted header to the slave MCU;
   decrypting, by the slave MCU, the encrypted header to obtain the information corresponding to the firmware data;
   obtaining, by the slave MCU, the plurality of firmware blocks from the master MCU according to a plurality of pre-defined settings and the information corresponding to the firmware data; and
   storing, by the slave MCU, the plurality of firmware blocks in a second memory of the slave MCU according to the predefined settings.

2. The data transmission method of claim 1, wherein the information comprises identifiers, offsets, sizes, attributes and authentication data of the plurality of firmware blocks.

3. The data transmission method of claim 1, wherein the plurality of pre-defined settings correspond to the information corresponding to the firmware data, and wherein the plurality of pre-defined settings comprises rules or policies of downloading each firmware block to its corresponding destination address in the second memory.

4. The data transmission method of claim 1, wherein the decrypting the encrypted header comprises:
   decrypting, by the slave MCU, the encrypted header through a key to obtain the information corresponding to the firmware data, wherein the key is stored in a one-time-programmable (OTP) memory of the slave MCU.

5. The data transmission method of claim 1, wherein obtaining the plurality of firmware blocks from the master MCU according to the plurality of pre-defined settings and the information corresponding to the firmware data comprises:
   transmitting, by the slave MCU, a request message to the master MCU to obtain at least one of the plurality of firmware blocks according to the plurality of pre-defined settings and the information corresponding to the firmware data; and
   transmitting, by the master MCU, the at least one of the plurality of firmware blocks to the slave MCU.

6. The data transmission method of claim 1, further comprising:
   decrypting or decompressing, by the slave MCU, at least one of the plurality of firmware blocks from the master MCU in response to the at least one of the plurality of firmware blocks having previously been encrypted or compressed.

7. The data transmission method of claim 1, further comprising:
   transmitting, by the master MCU, more than one firmware block to the slave MCU at once in response to the master MCU and the slave MCU supporting multi-channel communication.

8. The data transmission method of claim 1, further comprising:

transmitting, by the slave MCU, a close session message to the master MCU in response to a download process for the plurality of firmware blocks having been completed.

9. The data transmission method of claim 1, further comprising:
storing, by the slave MCU, the encrypted header from the master MCU in a buffer of the slave MCU.

10. The data transmission method of claim 1, wherein the first memory is a non-volatile memory and the second memory is a volatile memory.

11. An apparatus, comprising:
a master microcontroller (MCU), comprising:
a first communication circuit;
a first memory; and
a first processor, coupled to the first communication unit and the first memory; and
a slave microcontroller, comprising:
a second communication circuit;
a second memory; and
a second processor, coupled to the second communication unit and the second memory,
wherein during operation, the first processor and the second processor perform operations comprising:
storing, by the first processor, an encrypted header and firmware data associated with the slave MCU of the apparatus in the first memory, wherein the encrypted header comprises information corresponding to the firmware data, and the firmware data comprises a plurality of firmware blocks;
transmitting, by the first processor, the encrypted header to the slave MCU through the first communication circuit;
decrypting, by the second processor, the encrypted header to obtain the information corresponding to the firmware data;
obtaining, by the second processor, the plurality of firmware blocks from the master MCU through the second communication circuit according to a plurality of pre-defined settings and the information corresponding to the firmware data; and
storing, by the second processor, the plurality of firmware blocks in the second memory according to the plurality of predefined settings.

12. The apparatus of claim 11, wherein the information comprises identifiers, offsets, sizes, attributes and authentication data of the plurality of firmware blocks.

13. The apparatus of claim 11, wherein the plurality of pre-defined settings correspond to the information corresponding to the firmware data, and wherein the plurality of pre-defined settings comprises rules or policies of downloading each firmware block to its corresponding destination address in the second memory.

14. The apparatus of claim 11, wherein during operation, the second processor performs operations further comprising:
decrypting, by the second processor, the encrypted header through a key to obtain the information corresponding to the firmware data, wherein the key is stored in a one-time-programmable (OTP) memory of the slave MCU.

15. The apparatus of claim 11, wherein during operation, the first processor and the second processor further perform operations comprising:
transmitting, by the second processor, a request message to the master MCU through the second communication circuit to obtain at least one of the plurality of firmware blocks according to the plurality of pre-defined settings and the information corresponding to the firmware data; and
transmitting, by the first processor, the at least one of the plurality of firmware blocks to the slave MCU through the first communication circuit.

16. The apparatus of claim 11, wherein during operation, the second processor performs operations further comprising:
decrypting or decompressing, by the second processor, at least one of the plurality of firmware blocks from the master MCU in response to the at least one of the plurality of firmware blocks having previously been encrypted or compressed.

17. The apparatus of claim 11, wherein during operation, the first processor performs operations further comprising:
transmitting, by the first processor, more than one firmware block to the slave MCU at once through the first communication circuit in response to the master MCU and the slave MCU supporting multi-channel communication.

18. The apparatus of claim 11, wherein during operation, the second processor performs operations further comprising:
transmitting, by the second processor, a close session message to the master MCU in response to a download process for the plurality of firmware blocks having been completed.

19. The apparatus of claim 11, wherein during operation, the second processor performs operations further comprising:
storing, by the second processor, the encrypted header from the master MCU in a buffer of the slave MCU.

20. The apparatus of claim 11, wherein the first memory is a non-volatile memory and the second memory is a volatile memory.

* * * * *